United States Patent
Shoji et al.

(10) Patent No.: US 6,746,979 B2
(45) Date of Patent: Jun. 8, 2004

(54) ALUMINA FIBER AGGREGATE AND ITS PRODUCTION METHOD

(75) Inventors: Mamoru Shoji, Niigata-ken (JP); Norio Ikeda, Niigata-ken (JP); Toshiaki Sasaki, Niigata-ken (JP)

(73) Assignee: Mitsubishi Chemical Functional Products, Inc., Tokyo (JP)

( * ) Notice: Subject to any disclaimer, the term of this patent is extended or adjusted under 35 U.S.C. 154(b) by 0 days.

(21) Appl. No.: 10/392,941

(22) Filed: Mar. 20, 2003

(65) Prior Publication Data

US 2003/0219590 A1 Nov. 27, 2003

Related U.S. Application Data

(63) Continuation of application No. PCT/JP02/07383, filed on Jul. 22, 2002.

(30) Foreign Application Priority Data

Jul. 23, 2001 (JP) ........................................ 2001-221429

(51) Int. Cl.[7] ............................ D01F 6/00; C04B 35/00
(52) U.S. Cl. ........................................ 501/95.1; 428/364
(58) Field of Search .......................... 428/364; 501/95.1

(56) References Cited

U.S. PATENT DOCUMENTS

| | | | |
|---|---|---|---|
| 4,752,515 A | | 6/1988 | Hosoi et al. ............... 428/114 |
| 4,938,844 A | * | 7/1990 | Ito et al. .................... 162/102 |
| 5,059,107 A | * | 10/1991 | Isomura et al. ........ 425/174.8 R |
| 5,131,827 A | * | 7/1992 | Tasaka ....................... 418/55.2 |
| 5,165,463 A | * | 11/1992 | Aghajanian et al. .......... 164/97 |
| 5,866,079 A | | 2/1999 | Machida et al. ............. 422/179 |
| 6,165,605 A | * | 12/2000 | Fujita ....................... 428/312.8 |

FOREIGN PATENT DOCUMENTS

| | | | |
|---|---|---|---|
| EP | 0 495 466 B1 | 9/1998 | ............. D01F/9/08 |
| EP | 0 971 057 A1 | 1/2000 | .......... D01G/25/00 |
| JP | 04-041757 | 2/1992 | ............. D04H/1/46 |
| JP | 04-041758 | 2/1992 | ............. D04H/1/46 |
| JP | 2001-207341 | 8/2001 | ............. D01F/9/08 |
| JP | 2002-212836 | 7/2002 | ............. D01F/9/08 |
| JP | 2003105658 | * | 4/2003 |

OTHER PUBLICATIONS

A copy of the International Search Report issued in corresponding Japanese Patent Application No. PCT/JP02/07383. Date of Mailing of International Search Report: Oct. 8, 2002.

* cited by examiner

*Primary Examiner*—N. Edwards
(74) *Attorney, Agent, or Firm*—Edwards & Angell, LLP; David G. Conlin; Richard J. Roos

(57) ABSTRACT

An alumina fiber aggregate comprising alumina short fibers whose average diameter is 4.0 to 10.0 $\mu$m and smallest diameter is not less than 3.0 $\mu$m, and a method of producing an alumina fiber aggregate which comprises spinning a spinning solution containing basic aluminum chloride, a silicon compound, an organic polymer and water by the blowing method, and calcining the obtained aggregate of alumina short fiber precursor, the spinning solution being one in which the aluminum/silicon ratio is 99/1 to 65/35 calculated as $Al_2O_3/SiO_2$ ratio by weight, the concentration of basic aluminum chloride is 180 to 200 g/L and the concentration of the organic polymer is 20 to 40 g/L. The alumina short fibers in the alumina fiber aggregate are enlarged in diameter to suppress scattering of the fibers.

7 Claims, No Drawings

ALUMINA FIBER AGGREGATE AND ITS PRODUCTION METHOD

CROSS REFERENCE TO RELATED APPLICATIONS

This Continuation application claims priority to co-pending PCT International Application No. PCT/JP02/07383, which was filed Jul. 22, 2002, and which claims priority to Japanese Application No. 2001-221429, which was filed Jul. 23, 2001. The entireties of these applications are incorporated by reference herein.

TECHNICAL FIELD

The present invention relates to an alumina fiber aggregate and its production method.

BACKGROUND ART

Alumina fiber aggregates, by making use of their excellent heat resistance, are worked into alumina fiber blankets, etc., and used as heat insulator, etc. Such alumina fiber blankets can be produced, for instance, in the following way.

Spinning is carried out with a spinning solution containing basic aluminum chloride, a silicon compound, an organic polymer and water by the blowing method and the obtained alumina short fiber precursor aggregate (laminated sheet) is subjected to calcining, if necessary after needling. In the calcining step, the volatiles are removed and at the same time crystallization of alumina and silica is advanced to convert them into alumina fibers. Consequently, an alumina fiber aggregate comprising alumina short fibers is obtained. This production method is generally called precursor fiberizing method.

It is to be noted that when the diameter of alumina short fibers is small, these fibers tend to scatter and are bad in handling characteristics and also undesirable for the working environmental hygiene. It is pointed out that the fibers with a diameter of less than several $\mu$m have the problems such as easy entrance into pulmonary alveoli of the human body through respiration.

The present invention has been made in view of the above circumstances, and its object is to provide an alumina fiber aggregate comprising alumina short fibers having their diameter enlarged to suppress scattering of the fibers, and a method of producing such an alumina fiber aggregate.

DISCLOSURE OF THE INVENTION

As a result of earnest studies, the present inventors have found that the diameter of alumina short fibers varies depending on the properties of the spinning solution used, and it is possible to obtain alumina short fibers with a large diameter and a narrow distribution of fiber diameter by using a spinning solution of specific properties and optimizing the spinning conditions. This finding has led to the attainment of the present invention.

The present invention have been completed on the basis of the above finding, and in the first aspect of the present invention, there is provided an alumina fiber aggregate comprising alumina short fibers having an average diameter of 4.0 to 10.0 $\mu$m, with the smallest diameter being not less than 3.0 $\mu$m.

In the second aspect of the present invention, there is provided a method of producing an alumina fiber aggregate comprising alumina short fibers having an average diameter of 4.0 to 10.0 $\mu$m, with the smallest diameter being not less than 3.0 $\mu$m, which method comprises carrying out spinning with a spinning solution containing basic aluminum chloride, a silicon compound, an organic polymer and water by the blowing method, and calcining the obtained alumina short fiber precursor aggregate, the said spinning solution being one in which the aluminum/silicon ratio is from 99/1 to 65/35 calculated as $Al_2O_3/SiO_2$ ratio by weight, the concentration of basic aluminum chloride is 180 to 200 g/L, and the concentration of organic polymer is 20 to 40 g/L.

Hereinafter, the present invention is explained in detail. Firstly, for the convenience of explanation, the method of producing an alumina fiber aggregate according to the present invention is explained.

The production method of the present invention comprises carrying out spinning with a spinning solution containing basic aluminum chloride, a silicon compound, an organic polymer and water by the blowing method, and calcining the obtained alumina short fiber precursor aggregate (precursor fiberizing method). The method comprises essentially a spinning solution preparation step, a spinning step and a calcining step, with a needling step incorporated optionally between the spinning step and the calcining step.

Spinning Solution Preparation Step

Basic aluminum chloride $Al(OH)_{3-x}Cl_x$ can be prepared, for example, by dissolving metallic aluminum in hydrochloric acid or an aluminum chloride solution. The value of X in the above chemical formula is usually 0.45 to 0.54, preferably 0.50 to 0.53. As the silicon compound, silica sol is preferably used, but water-soluble silicon compounds such as tetraethyl silicate and water-soluble siloxane derivatives are also usable. As the organic polymer, water-soluble high-molecular compounds such as polyvinyl alcohol, polyethylene glycol and polyacrylamide are preferably used. The polymerization degree of these polymers is usually 1,000 to 3,000.

In the present invention, as the said spinning solution, it is important to use a solution in which the aluminum/silicon ratio is 99/1 to 65/35 calculated as $Al_2O_2/SiO_2$ ratio by weight, the concentration of basic aluminum chloride is 180 to 200 g/L, and the concentration of organic polymer is 20 to 40 g/L.

When the amount of the silicon compound is below the above-defined range, alumina composing the short fibers tends to convert into $\alpha$-alumina and also the short fibers tends to be weak due to coarsening of the alumina grains. On the other hand, when the amount of the silicon compound exceeds the above-defined range, the amount of silica produced with mullite $(3Al_2O_3.2SiO_2)$ is increased to reduce heat resistance of the product. The aluminum/silicon ratio, calculated as $Al_2O_3/SiO_2$ ratio by weight, is usually 99/1 to 65/35, preferably 99/1 to 70/30, more preferably 98/2 to 72/28.

When the concentration of basic aluminum chloride is less than 180 g/L or when the concentration of the organic polymer is less than 20 g/L, appropriate viscosity can not be obtained, resulting in a reduced fiber diameter. That is, because of too much free water in the spinning solution, the drying speed in spinning by the blowing method is low, causing excessive advance of drawing and variation of diameter of the spun out precursor fibers, making it impossible to obtain the short fibers enlarged in diameter and narrow in distribution of diameter. Further, productivity lowers when the concentration of basic aluminum chloride is less than 180 g/L. On the other hand, when the concentration of basic aluminum chloride exceeds 200 g/L or when the concentration of the organic polymer exceeds 40 g/L, the desired spinning solution can not be obtained because of too high viscosity. The preferred concentration of basic aluminum chloride is 185 to 195 g/L and the preferred concentration of the organic polymer is 30 to 40 g/L.

The said spinning solution is prepared by adding a silicon compound and an organic polymer in a basic aluminum chloride solution so that the concentrations of the basic aluminum chloride and the organic polymer will fall in the above-defined ranges. The viscosity of the spinning solution at normal temperature is usually 1 to 1,000 poises, preferably 10 to 100 poises.

Spinning

Spinning (fiberization of the spinning solution) is carried out by the blowing method in which the spinning solution is supplied into a high-speed spinning air stream, whereby alumina short fiber precursor with a length of several ten to several hundred mm can be obtained.

The spinning nozzle used for the said spinning operation is not specifically restricted structurally, but it is preferably of a structure in which, as for instance described in European Patent No. 495,466 (Japanese Patent No. 2,602,460), the air stream blown out from the air nozzle and the flow of spinning solution forced out from the spinning solution supply nozzles are parallelized to each other, and the parallel flow of air, after having been well rectified, is brought into contact with the spinning solution. In this case, the diameter of the spinning nozzle is usually 0.1 to 0.5 mm, the amount of the solution supplied from the spinning solution supply nozzles is usually 1 to 120 ml/h, preferably 3 to 50 ml per nozzle, and the gas flow rate from the air nozzle is usually 40 to 200 m/s per slit.

According to the spinning nozzle described above, the spinning solution forced out from the spinning solution supply nozzles won't be atomized and the formed fibers are, therefore, sufficiently drawn and hardly attached to each other, so that by optimizing the spinning conditions, it is possible to obtain alumina fiber precursors with a narrow and uniform distribution of fiber diameter.

In carrying out spinning, it is preferable that the sufficiently drawn fibers are formed from the spinning solution under a condition which can suppress evaporation of water or decomposition of the spinning solution, and these fibers are dried quickly. For attaining this, it is preferable to change the spinning atmosphere from a state of suppressing evaporation of water to a state of promoting it in the process from formation of the fibers from the spinning solution until they reach the fiber collector. It is therefore preferable that the temperature around which the contact of the spinning solution with the air stream is begun is set at 10 to 20° C., the temperature of the air stream near the fiber collector is set at 40 to 50° C., and the relative humidity (RH) is made less than 30%.

When the ambient temperature is too high at the stage when the sufficiently drawn fibers are to be formed from the spinning solution, there can hardly be formed the sufficiently drawn fibers because of rapid evaporation of water and other causes. Also, defects are produced in the formed fibers and the finally obtained inorganic oxide fibers become weak. On the other hand, in case where the fibers are formed from the spinning solution at a low temperature or in a high-humidity atmosphere for suppressing evaporation, there is a tendency to cause adhesion of the fibers to each other or formation of droplets of the solution due to recovery of resilience to produce shots, since the same atmosphere is maintained even after formation of the fibers.

The aggregate of alumina short fibers is led into an accumulating apparatus comprising a wire gauze endless belt arranged to become substantially vertical to the spinning air stream, and with this endless belt being moved rotationally, the spinning air stream containing the alumina short fiber precursor is let impinge against the said endless belt, whereby to form and recover a continuous sheet (thin-layer sheet).

The thin-layer sheet recovered from the said accumulating apparatus is continuously drawn out and transferred into a folding device whereby the sheet is folded to a predetermined width and laminated while continuously moved in the direction substantially vertical to the folding direction to thereby form a laminated sheet. By this operation, since both ends of the thin-layer sheet in its width direction are positioned inside of the formed laminated sheet, the basis weight of the laminated sheet is uniformized throughout the sheet. As the folding device, the one disclosed in European Patent Application Laid-Open No. 971057 (Japanese Patent Application Laid-Open (KOKAI) No. 2000-80547) can be used.

Needling Step

By conducting needling on the alumina short fiber precursor aggregate (laminated sheet), it is possible to obtain an alumina fiber aggregate having high mechanical strength and oriented in the thickness direction, too. Needling is carried out at a rate of usually 1 to 50 punches/cm$^2$. Generally, the higher the rate of needling, the higher the bulk density and peel strength of the obtained alumina fiber aggregate.

Calcining Step

Calcining is carried out at a temperature of usually not lower than 500° C., preferably at 700 to 1,400° C. When the calcining temperature is below 500° C., the crystallization is insufficient to obtain weak low-strength alumina short fibers, and when the calcining temperature exceeds 1,400° C., the growth of the fiber crystal grains advances to produce only the weak low-strength alumina short fibers.

Next, the alumina short fiber aggregate of the present invention is explained. The alumina fiber aggregate according to the present invention can be obtained, for example, by the method described above, and structurally comprises alumina short fibers. The alumina short fibers composing the alumina fiber aggregate are large in diameter and have a narrow distribution of diameter. That is, the alumina fiber aggregate of the present invention has a characteristic feature that the average diameter of the alumina short fibers in the said aggregate is 4.0 to 10.0 μm, with the smallest diameter being not less than 3.0 μm. The lower limit of average diameter of the alumina short fibers is preferably 4.0 μm, more preferably 5.0 μm. The average diameter of the alumina short fibers is preferably 5.0 to 8.0 μm, more preferably 6.0 to 8.0 μm.

Increase of the fibers with a small diameter leads to an enhanced tendency for the fibers to scatter, which adversely affects the handling qualities of the fibers and is also undesirable for the working environmental hygiene. Also, too large fiber diameter is undesirable since generally it reduces heat insulating properties or resilience of the alumina short fiber aggregate. The above frequency distribution means the values determined according to the fiber diameter distribution measuring method described later. The length of the alumina short fibers obtained here is usually 10 to 500 mm.

The alumina fiber aggregate of the present invention, which has the characteristic features such as explained above, is capable of minimizing scattering of the fibers during handling in the production process of, for example, alumina fiber blankets, and thus excels in handling qualities and working environmental hygiene.

Best Mode for Carrying out the Invention

Hereinafter, the present invention is described in further detail with reference to the examples thereof, but the present invention is not limited to these examples but can be embodied in other forms without departing from the scope of the invention. In the following Examples and Comparative Examples, the diameter distribution of the alumina single fibers was determined according to the following procedure.

Determination of Fiber Diameter Distribution (1) A earpickful of fibers are nipped off from an alumina fiber mat by forceps.
(2) The fibers nipped off in (1) are placed, in such a manner as will not overlap each other as much as possible, on a carbon-made conductive tape pasted to an observation specimen holder of a scanning electron microscope (SEM).
(3) A platinum-palladium film is deposited to a thickness of 1 to 3 nm on the specimen surface to provide conductivity to the surfaces of the individual fibers of (2).
(4) The deposited specimen for analysis is placed in a measuring chamber of SEM and observed at a magnification suited for measuring the fiber diameter, and the observed image is photographed. There was used a scanning electron microscope "JSM-6320F" mfd. by Nippon Electron Co., Ltd., and as the observation conditions, an acceleration voltage of 15 KV and a work distance (WD) of 15 mm were used. The magnification was properly selected from within the range of X1,000 to X3,000.
(5) The fiber diameter is measured to the unit of 0.1 mm by a slide caliper or a straightedge from the SEM photograph obtained in (4). The diameters of the randomly collected 100 pieces of fiber are measured.
(6) The average fiber diameter is calculated from the following equation. The calculated values are rounded to one decimal.
(7) Here, in case where a doubt is produced on the lower threshold fiber diameter in view of the tendency of frequency distribution of fiber diameter, measurement is repeated usually 2 to 4 times and the diameter whose frequency distribution is greater than 1% on the average is reckoned as the minimum fiber diameter.

Average fiber diameter ($\mu$m)={total of measured values of diameter of 100 fibers/(100×observation magnification)}×1,000

EXAMPLE 1

Preparation of Spinning Solution

First, to an aqueous solution of basic aluminum chloride $Al(OH)_{3-x}Cl_x$ (X=0.51) with an aluminum concentration of 165 g/L, a 20 wt % silica sol solution and a 5 wt % polyvinyl alcohol (polymerization degree: 1,700) solution were added in amounts of 606 g and 608 g, respectively, based on 1.0 liter of the said aqueous solution of $Al(OH)_{3-x}Cl_x$, and mixed, and the mixed solution was concentrated under reduced pressure at 50° C. to obtain a spinning solution. Viscosity of the spinning solution was 60 poises (as measured by a rotational viscometer at 25° C.), the aluminum/silicon ratio ($Al_2O_3/SiO_2$ ratio by weight) was 72.0/28.0, the concentration of basic aluminum chloride was 190 g/L, and the concentration of the organic polymer was 35.0 g/L.

Spinning

The above spinning solution was spun by the blowing method. A spinning nozzle of the same structure as shown in FIG. 6 of European Patent No. 495,466 (Japanese Patent No. 2,602,460) was used. Spinning was carried out under the following conditions: spinning solution supply nozzle diameter=0.3 mm; amount of the solution supplied from the spinning solution supply nozzles=5 ml/h per nozzle; air flow rate (at the slit of the air nozzle)=54 m/s (pressure: 2 kg/cm$^2$; temperature: 18° C., RH: 40%). In collecting fibers, the air stream near the fiber collector was adjusted to 40° C. and 20% RH by introducing to the screen the dry 150° C. hot air flowing parallel to the high-speed air stream. The fibers were led into an accumulating apparatus of a structure comprising a wire gauge endless belt arranged to be substantially vertical to the spinning air stream, in which the spinning air stream containing the alumina fiber precursor is let impinge against the said endless belt which is being rotated, thereby to recover a continuous sheet (thin-layer sheet).

The thin-layer sheet recovered from the accumulating apparatus was continuously drawn out and led into a folding device whereby the sheet was folded to a predetermined width and laminated while continuously moved in the direction vertical to the folding direction to thereby form a laminated sheet. A folding device of the same structure as described in European Patent Laid-Open No. 971,057 (Japanese Patent Laid-Open No. 2000-80547).

Production of Alumina Fiber Aggregate

The above laminated sheet (aggregate of alumina short fiber precursor) was subjected to needling and then calcined in the air at 1,250° C. for one hour to obtain an alumina fiber aggregate. Needling was carried out by a needle punching machine at a rate of 8 punches/cm$^2$. The result of determination of diameter distribution of the alumina short fibers composing the obtained alumina fiber aggregate is shown in Table 1. The average fiber diameter was 6.9 $\mu$m and the smallest fiber diameter was 5.2 $\mu$m.

EXAMPLE 2

Preparation of Spinning Solution

First, to an aqueous solution of basic aluminum chloride $Al(OH)_{3-x}Cl_x$ (X=0.51) with an aluminum concentration of 165 g/L, a 20 wt % silica sol solution and a 5 wt % polyvinyl alcohol (polymerization degree: 1,700) solution were added in amounts of 606 g and 608 g, respectively, based on 1.0 liter of the said aqueous solution of $Al(OH)_{3-x}Cl_x$ and mixed, and the mixed solution was concentrated under reduced pressure at 50° C. to obtain a spinning solution. Viscosity of the spinning solution was 40 poises (measured at 25° C. by a rotational viscometer), the aluminum/silicon ratio ($Al_2O_3/SiO_2$ ratio by weight) was 7.20/28.0, the concentration of basic aluminum chloride was 180 g/L, and the concentration of the organic polymer was 33.2 g /L.

Spinning and Production of Alumina Fiber Aggregate

The same procedures as defined in Example 1 were conducted. The result of determination of diameter distribution of the alumina short fibers composing the obtained alumina fiber aggregate is shown in Table 1. The average fiber diameter was 4.9 $\mu$m and the smallest fiber diameter was 3.3 $\mu$m.

COMPARATIVE EXAMPLE 1

Preparation of Spinning Solution

To an aqueous solution of basic aluminum chloride $Al(OH)_{3-x}Cl_x$ (X=0.56) with an aluminum concentration of 75 g/L, a 20 wt % silica sol solution and a 5 wt % polyvinyl alcohol (polymerization degree: 1,700) solution were added in amounts of 276 g and 315 g, respectively, based on 1.0 liter of the said aqueous solution of $Al(OH)_{3-x}Cl_x$ and mixed, and the mixed solution was concentrated under reduced pressure at 50° C. to obtain a spinning solution. Viscosity of the spinning solution was 40 poises (measured at 25° C. by a rotational viscometer), the aluminum/silicon ratio ($Al_2O_3/SiO_2$ ratio by weight) was 72.0/28.0, the concentration of basic aluminum chloride was 160 g/L, and the concentration of the organic polymer was 33.6 g/L.

Spinning and Production of Alumina Fiber Aggregate

The same spinning nozzle as used in Example 1 was used. Spinning was carried out under the following conditions: spinning solution supply nozzle diameter=0.3 mm, the amount of the solution supplied by the spinning solution supply nozzles=5 ml/h per nozzle: air flow rate (at the slit of the air nozzle)=54 m/s (pressure: 2 kg/cm$^2$; temperature: 18° C.; RH: 40%). In collecting fibers, the air stream near the fiber collector was adjusted to 35° C. and 30% RH by introducing to the screen the 90° C. hot air flowing parallel to the high-speed air stream, and the fibers were recovered as a continuous sheet (thin-layer sheet) by using the same fiber collector and accumulating apparatus as used in Example 1. The result of determination of diameter distribution of the alumina short fibers composing the obtained alumina fiber aggregate is shown in Table 1. The average fiber diameter was 6.6 μm and the smallest fiber diameter was 2.2 μm.

COMPARATIVE EXAMPLE 2

Preparation of Spinning Solution

To an aqueous solution of basic aluminum chloride Al(OH)$_{3-x}$Cl$_x$ (X=0.51) with an aluminum concentration of 165 g/L, a 20 wt % silica sol solution and a 5 wt % polyvinyl alcohol (polymerization degree: 1,700) solution were added in amounts of 606 g and 260 g, respectively, based on 1.0 liter of the said aqueous solution of Al(OH)$_{3-x}$Cl$_x$ and mixed, and the mixed solution was concentrated under reduced pressure at 50° C. to obtain a spinning solution. Viscosity of the spinning solution was 8 poises (measured at 25° C. by a rotational viscometer), the aluminum/silicon ratio (Al$_2$O$_3$/SiO$_2$ ratio by weight) was 72.0/28.0, the concentration of basic aluminum chloride was 190 g/L, and the concentration of the organic polymer was 15.0 g/L.

Spinning and Production of Alumina Fiber Aggregate

The same procedures as defined in Example 1 were conducted. The result of determination of diameter distribution of alumina short fibers composing the obtained alumina fiber aggregate is shown in Table 1. The average fiber diameter was 2.3 μm and the smallest fiber diameter was 0.4 μm.

COMPARATIVE EXAMPLE 3

Preparation of Spinning Solution

To an aqueous solution of basic aluminum chloride Al(OH)$_{3-x}$Cl$_x$ (X=0.51) with an aluminum concentration of 165 g/L, a 20 wt % silica sol solution and a 5 wt % polyvinyl alcohol (polymerization degree: 1,700) solution were added in amounts of 606 g and 550 g, respectively, based on 1.0 liter of the said aqueous solution of Al(OH)$_{3-x}$Cl$_x$ and mixed, and the mixed solution was concentrated under reduced pressure at 50° C., adjusting the aluminum/silicon ratio (Al$_2$O$_3$/SiO$_2$ ratio by weight) to 72.0/28.0, the concentration of basic aluminum chloride to 210 g/L and the concentration of the organic polymer to 35.0 g/L. However, the obtained composition assumed a solid state at the stage of concentration and would not become a spinning solution.

COMPARATIVE EXAMPLE 4

Preparation of Spinning Solution

To an aqueous solution of basic aluminum chloride Al(OH)$_{3-x}$Cl$_x$ (X=0.51) with an aluminum concentration of 165 g/L, a 20 wt % silica sol solution and a 5 wt % polyvinyl alcohol (polymerization degree: 1,700) solution were added in amounts of 606 g and 868 g, respectively, based on 1.0 liter of the said aqueous solution of Al(OH)$_{3-x}$Cl$_x$ and mixed, and the mixed solution was concentrated under reduced pressure at 50° C., adjusting the aluminum/silicon ratio (Al$_2$O$_3$/SiO$_2$ ratio by weight) to 72.0/28.0, the concentration of basic aluminum chloride to 190 g/L and the concentration of the organic polymer to 50.0 g/L. However, the obtained composition became too high in viscosity at the stage of concentration and was in such a state that it was unable to make proper measurement of viscosity by a rotational viscometer and to conduct spinning.

TABLE 1

| Fiber diameter (μm) | <Frequency distribution> | | | |
|---|---|---|---|---|
| | Example 1 | Example 2 | Comp. Example 1 | Comp. Example 2 |
| 0.0 ≤ | — | — | — | 2 |
| 0.5 ≤ | — | — | — | 9 |
| 1.0 ≤ | — | — | — | 18 |
| 1.5 ≤ | — | — | — | 25 |
| 2.0 ≤ | — | — | 1 | 15 |
| 2.5 ≤ | — | — | 5 | 5 |
| 3.0 ≤ | — | 1 | 8 | 6 |
| 3.5 ≤ | — | 6 | 3 | 7 |
| 4.0 ≤ | — | 13 | 8 | 3 |
| 4.5 ≤ | — | 33 | 18 | 2 |
| 5.0 ≤ | 5 | 18 | 11 | 2 |
| 5.5 ≤ | 13 | 21 | 9 | 3 |
| 6.0 ≤ | 32 | 1 | 7 | 1 |
| 6.5 ≤ | 21 | 4 | 3 | — |
| 7.0 ≤ | 8 | — | 5 | 1 |
| 7.5 ≤ | 7 | — | 3 | — |
| 8.0 ≤ | 5 | — | 2 | 1 |
| 8.5 ≤ | 3 | — | 5 | — |
| 9.0 ≤ | 1 | — | 2 | — |
| 9.5 ≤ | 1 | — | 4 | — |
| 10.0 ≤ | 4 | — | 6 | — |
| Number of fibers measured | 100 | 100 | 100 | 100 |
| Average | 6.9 | 4.9 | 6.6 | 2.3 |
| Smallest | 5.2 | 3.3 | 2.2 | 0.4 |

REFERENTIAL EXAMPLE 1

The average diameter of the conventional alumina fibers is generally 2 to 5 μm. Analysis was made on the alumina fibers commercially sold by the three companies. The results were as shown in Table 2.

TABLE 2

| | Average fiber diameter (μm) | Smallest fiber diameter (μm) |
|---|---|---|
| Product of A company | | |
| Lot 1 | 3.6 | 1.1 |
| Lot 2 | 3.7 | 1.4 |
| Lot 3 | 4.6 | 1.8 |
| Lot 4 | 3.0 | 0.7 |
| Product of B company | 3.0 | 1.3 |
| Product of C company | | |
| Lot 1 | 3.5 | 1.1 |
| Lot 2 | 4.2 | 1.8 |
| Lot 3 | 4.7 | 2.2 |

Industrial Applicability

As explained above, according to the present invention, there are provided an alumina fiber aggregate comprising alumina short fibers which are enlarged in diameter to suppress scattering of the fibers, and a method of producing such a fiber aggregate. This alumina fiber aggregate is minimized in scattering of fibers during handling and excels in handing qualities and working environmental hygiene.

What is claimed is:

1. An alumina fiber aggregate comprising alumina short fibers whose average diameter is 4.0 to 10.0 μm and smallest diameter is not less than 3.0 μm.

2. An alumina fiber aggregate according to claim 1 comprising alumina short fibers whose smallest diameter is not less than 4.0 μm.

3. An alumina fiber aggregate according to claim 1 comprising alumina short fibers whose smallest diameter is not less than 5.0 μm.

4. An alumina fiber aggregate according to claim 1 comprising alumina short fibers whose average diameter is 5.0 to 8.0 μm.

5. An alumina fiber aggregate according to claim 1 comprising alumina short fibers whose average diameter is 6.0 to 8.0 μm.

6. An alumina fiber aggregate according to claim 1, wherein the composition of the alumina short fibers is $Al_2O_3:SiO_2$=99:1 to 65:35 by weight.

7. A method of producing an alumina fiber aggregate as defined in claim 1, which comprises spinning a spinning solution containing basic aluminum chloride, a silicon compound, an organic polymer and water by the blowing method, and calcining the obtained alumina short fiber precursor aggregate, said spinning solution being one in which the aluminum/silicon ratio is 99/1 to 65/35 calculated as $Al_2O_3/SiO_2$ ratio by weight, the concentration of basic aluminum chloride is 180 to 200 g/L and the concentration of the organic polymer is 20 to 40 g/L.

* * * * *